United States Patent [19]
Lang

[11] 3,899,265
[45] Aug. 12, 1975

[54] METHOD AND APPARATUS TO PERFORATE PIPE

[75] Inventor: David Lang, Mineral Wells, Tex.

[73] Assignee: Harsco Corporation, Harrisburg, Pa.

[22] Filed: Dec. 27, 1973

[21] Appl. No.: 428,625

Related U.S. Application Data
[62] Division of Ser. No. 266,552, June 27, 1972, abandoned.

[52] U.S. Cl. .................. 408/50; 83/208; 83/369; 408/130; 425/142; 425/290
[51] Int. Cl.² .......................................... B29C 17/10
[58] Field of Search ............... 408/50, 69, 70, 130; 425/142, 290; 83/208, 369

[56] References Cited
UNITED STATES PATENTS

| | | |
|---|---|---|
| 2,214,811 | 9/1940 | Colmerauer .................. 408/50 |
| 2,655,058 | 10/1953 | Eschenburg et al. ............... 408/130 |
| 2,682,182 | 6/1954 | Armitage .......................... 408/69 |

*Primary Examiner*—J. M. Meister
*Assistant Examiner*—Z. R. Bilinsky
*Attorney, Agent, or Firm*—Cameron, Kerkam, Sutton, Stowell & Stowell

[57] ABSTRACT

A method and apparatus to perforate plastic pipe wherein a cam wheel is positioned in rolling contact with pipe delivered from an extruder. The cam wheel periodically actuates control apparatus to impart longitudinal movement to one or more continuously rotating drill bits to drill spaced apertures through the wall of the moving pipe.

7 Claims, 5 Drawing Figures

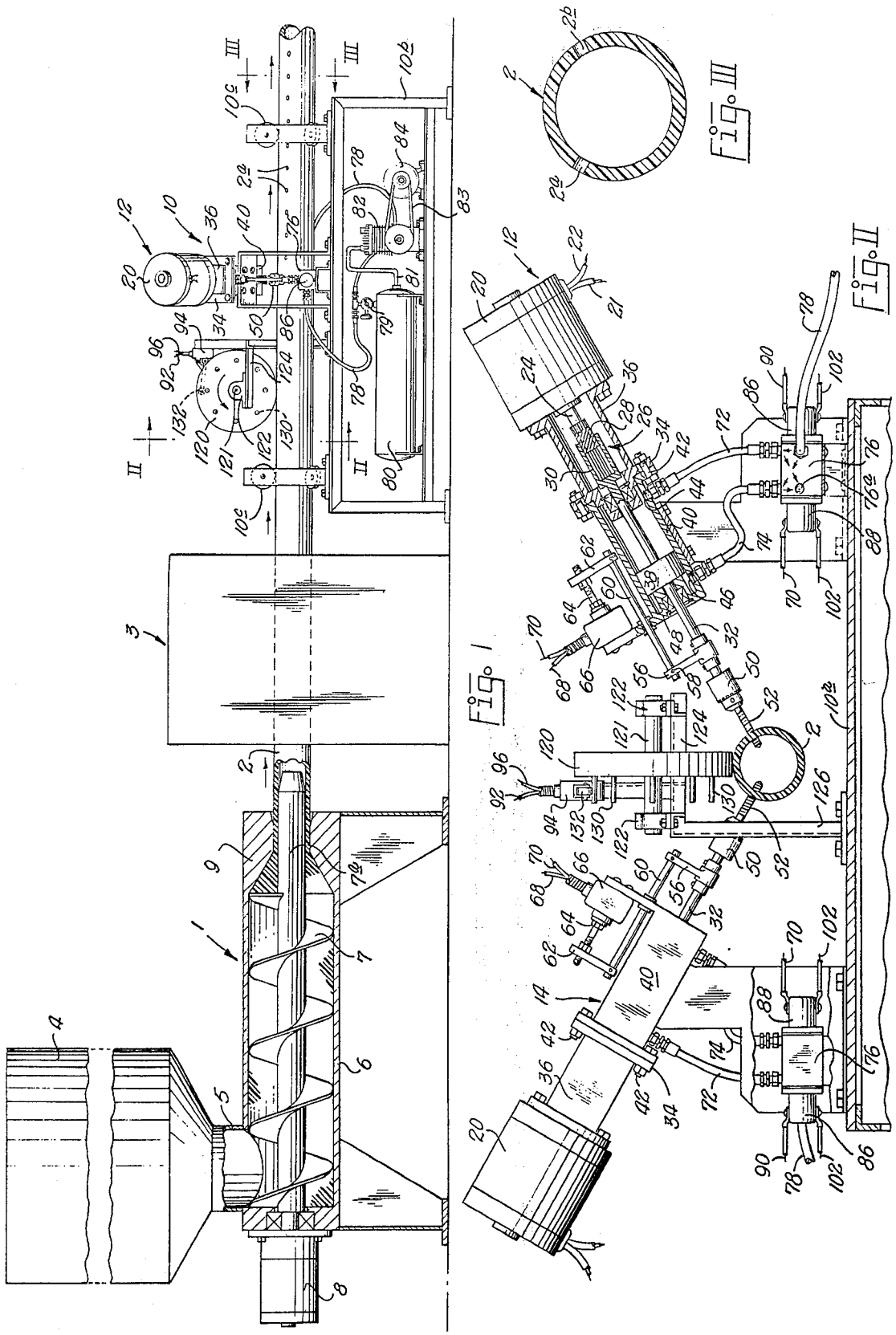

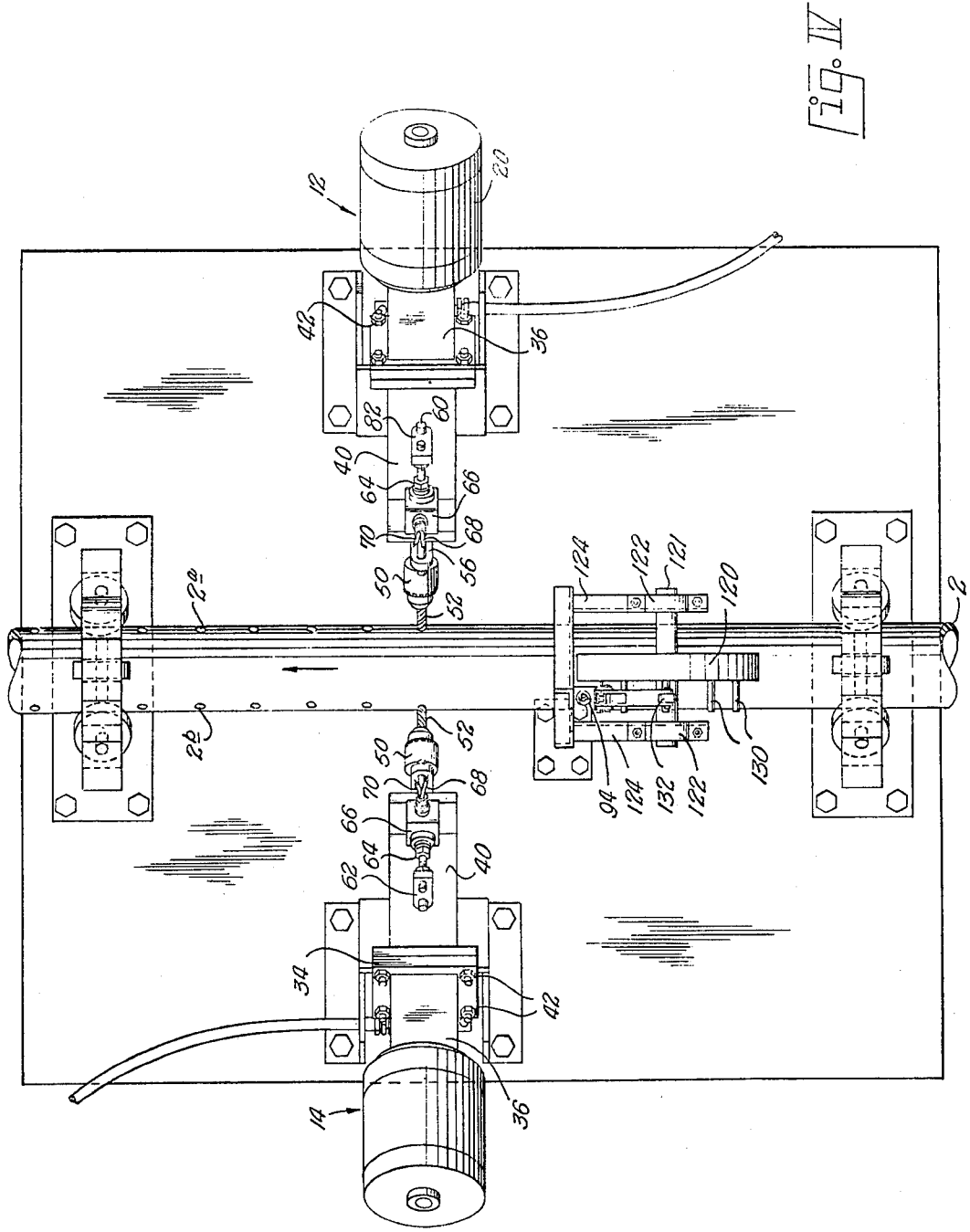

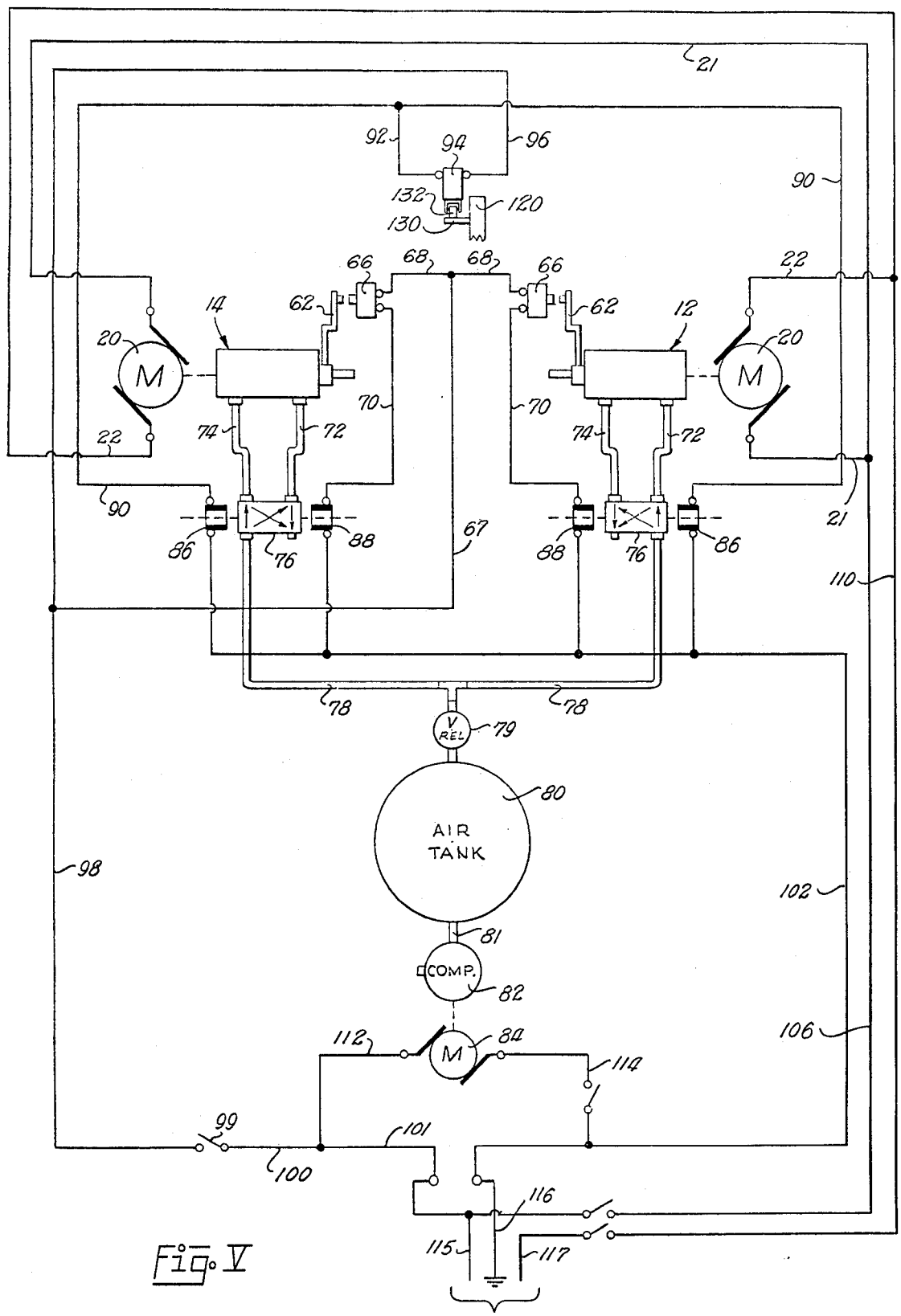
Fig. V

METHOD AND APPARATUS TO PERFORATE PIPE

CROSS REFERENCE TO RELATED APPLICATIONS

This is a division of Application Ser. No. 266,552 filed June 27, 1972, now abandoned.

BACKGROUND OF INVENTION

Perforated pipe is employed in drains, irrigation apparatus, and well casings.

Heretofore apparatus to automatically drill holes in a pipe wall to form perforations has been rather complex. To prevent elongation of holes elaborate apparatus has been employed for causing drills to move along with the pipe during the drilling process or the pipe has been momentarily stopped while drilling was being accomplished. Such method and apparatus was slow in operation and expensive to manufacture and maintain.

SUMMARY OF THE INVENTION

A method and apparatus for perforating pipe wherein pipe delivered from extruding apparatus is continuously fed between drills which are automatically and rapidly moved into contact with the pipe to drill spaced holes therein without unduly elongating the holes.

The apparatus comprises a drill bit secured to a continuously driven shaft which is adapted to reciprocate longitudinally to intermittently move the drill bit in a direction transverse to a direction of the travel of a pipe for moving the drill bit through the wall of the pipe.

The driven shaft is connected through an expandable coupling to the output shaft of a motor and has a piston secured thereto which is slidably disposed through a cylinder.

A cam wheel is disposed in rolling engagement with the surface of the pipe and has projections thereon arranged to actuate switching apparatus arranged to generate a control signal responsive to movement of the pipe. The control signal causes application of fluid pressure to move the piston and drill bit toward the pipe. Means is provided to generate a second signal responsive to longitudinal movement of the bit to actuate control apparatus to apply fluid pressure to urge the piston and the bit away from the surface of the pipe after the bit has moved a predetermined distance.

A primary object of the invention is to provide a method and apparatus for perforating pipe particularly adapted to drill holes in plastic pipe as the pipe is continuously moved past the drill.

Another object of the invention is to provide apparatus to perforate pipe having a drill bit arranged to be periodically moved into drilling engagement with the wall of a moving pipe and retracted at sufficient speed to prevent substantial elongation of a hole drilled in the pipe.

A further object of the invention is to provide apparatus for perforating pipe adapted to move a rotating perforating tool or bit toward the wall of the pipe responsive to movement of the pipe and adapted to retract the perforating tool responsive to longitudinal movement of the tool.

A still further object of the invention is to provide apparatus to perforate pipe arranged to form perforations through the wall of the pipe at predetermined spacing regardless of the speed of movement of the pipe.

A still further object of the invention is to provide apparatus for perforating pipe having control means adjustable for expeditiously changing spacing between perforations in pipe without material modification of the perforating apparatus.

A still further object of the invention is to provide apparatus for perforating pipe which is inexpensive to construct and maintain, making use thereof economically feasible for commercial application.

Other and further objects of the invention will become apparent upon referring to the detailed description hereinafter following and the drawings annexed hereto.

DESCRIPTION OF THE DRAWING

Drawings of a preferred embodiment of the invention are annexed hereto so that the invention may be better and more fully understood, in which:

FIG. I is a diagrammatic illustration of the method of perforating pipe, the perforating apparatus being illustrated in side elevation;

FIG. II is a cross-sectional view taken substantially along line II—II of FIG. I;

FIG. III is a cross-sectional view taken substantially along line III—III of FIG. I;

FIG. IV is a plan view of the perforating apparatus; and

FIG. V is a diagrammatic view illustrating the electrical and pneumatic control apparatus.

Numeral references are employed to designate like parts throughout the various figures of the drawing.

DESCRIPTION OF A PREFERRED EMBODIMENT

Referring to FIG. I of the drawing the numeral 1 generally designates apparatus for extruding a pipe 2 which is delivered through suitable cooling apparatus 3 to perforating apparatus generally indicated by numeral 10.

Extruding apparatus 1 is of conventional design, having a hopper 4 arranged to deliver resin through a feed throat 5 into a cylindrical barrel 6 having a screw 7 extending therethrough rotated by suitable means such as motor 8.

Resin is extruded through an orifice formed in die 9 to produce a continuous length of thermoplastic pipe 2. A suitable heating-cooling system (not shown) is employed to produce a fully plasticated, thermally homogeneous melt and to produce a uniform flow rate through the die 9.

Die 9 preferably has a round circular opening formed therein through which mandrel or pin 7a extends to form the inside of the tube 2.

The tubular extrudate moves into suitable apparatus for cooling and sizing the tubing. Cooling apparatus 3 may assume any desired configuration such as water quench bath.

Tube 2 passes from cooling apparatus 3 to perforating apparatus 10 where spaced apertures 2a and 2b are formed therein as illustrated in FIGS. I and III of the drawing. As best illustrated in FIGS. I, II and IV of the drawing perforating apparatus 10 comprises a plurality of drilling units 12 and 14 positioned adjacent opposite sides of the path along which pipe 2 is moved.

Each drilling unit 12 and 14 comprises an electric motor 20 energized through conductors 21 and 22 having an output shaft 24. Output shaft 24 is connected through an expandable coupling 26, comprising a splined shaft 28 secured to the outer end of output shaft 24 and slidably disposed in hub 30 having keyways formed therein.

Hub 30 is secured to a shaft 32 which extends through an aperture extending through the end wall 34 of housing 36 which is bolted or otherwise secured to motor 20.

Shaft 32 has a piston 38 secured thereto which is slidably disposed through cylinder 40 secured by suitable means such as bolts 42 to the end wall 34 of housing 36.

Cylinder 40 has openings 44 and 46 formed at opposite ends thereof communicating with suitable means for delivering pressurized fluid therethrough as will be hereinafter more fully explained.

Cylinder 40 has an end wall 48 extending across the outer end thereof having an aperture formed therethrough through which shaft 32 is slidably disposed.

The outer end of shaft 32 has a drill chuck 50 secured thereto to grippingly engage an end of drill bit 52.

Shaft 32 has an arm 56 secured thereto which is connected by suitable means such as set screw 58 to a rod 60 extending through an aperture in end wall 48 of cylinder 40. Rod 60 has a dog 62 secured thereto through which abutment bolt 64 extends.

A switch 66 is secured to end wall 48 of cylinder 40 and is adapted to be actuated by the end of bolt 64 as the end of drill bit 52 passes through the wall of pipe 2.

Switch 66 has conductors 68 and 70 connected to contacts thereof as will be hereinafter more fully explained.

Openings 44 and 46, communicating with opposite ends of cylinders 40, are connected through lines 72 and 74 with a four-way solenoid actuated valve 76. Valve 76 has an inlet port connected through line 78 and pressure relief valve 79 to a suitable source of pressurized fluid, such as air tank 80. Tank 80 is connected through a line 81 to an air compressor 82 driven through belt 83 by an electric motor 84.

Valve 76 is actuated by solenoids 86 and 88 arranged to move a valve element disposed therein in opposite directions.

As best illustrated in FIG. V solenoids 86 are connected through conductors 90 and conductor 92 to a contact of switch 94. Another contact of switch 94 is connected through conductor 98, switch 99, conductor 100, and conductor 101 to a source of electricity.

Solenoids 86 and 88 are connected through ground conductors 102 to the source of electricity.

It should be appreciated that switch 94 and solenoid 86 comprise actuating means associated with a cam wheel 120, as will be hereinafter more fully explained, and that solenoid actuated valve 76 and piston 38 comprise actuated means to move shaft 32 along a path intersecting the path along which pipe 2 is travelling.

Motors 20 of each drill unit 12 and 14 have windings connected through conductors 21 and conductor 106 to the source of electricity. The other side of windings of motors 20 of drill units 12 and 14 are connected through conductors 22 to a conductor 110 connected to the source of electricity.

Compressor Motor 84 has windings connected through conductors 112 and 114 to the source of electricity.

While the source of electrical power may be of any suitable design, in the particular form of the invention illustrated in FIG. V conductors 115, 116 and 117 are connected to generators of a municipal power plant (not shown).

As best illustrated in FIGS. I, II and IV, a cam wheel 120, secured to an axle 121 which is rotatably journaled in a bearing 122, is secured in rolling engagement with pipe 2.

Support member 124 having bearings 122 secured thereto, is carried by upwardly extending member 126 secured to a table element 10a attached to legs 10b of perforating apparatus 10.

Cam wheel 120 has outwardly extending projections 130 arranged to engage actuator arm 132 of switch 94. Projections 130 comprise bolts threaded into apertures in wheel 120. It should be appreciated that spacing of holes 2a in pipe 1 is related to the circumference of wheel 120 and spacing of projections 130 thereon.

The operation and function of apparatus hereinbefore described is as follows:

Pipe formed by extruding apparatus 1 is delivered through cooling apparatus 3 to the perforating apparatus 10. Pipe 2 moves between guide rollers 10c carried by table 10a of perforating apparatus and is directed along a path between drilling units 12 and 14. As cam wheel 120 rotates projections 130 thereon engage actuating arm 132 for closing contacts of switch 94.

As best illustrated in FIG. V when switch 94 is closed an electrical circuit is completed from one terminal of the source of electricity through conductors 101, 100, 98, 96, and 92 and through conductors 90 to energize solenoids 86. When solenoids 86 are energized valves 76 are shifted to the position wherein pressurized fluid, such as compressed air, is delivered from tank 80 through lines 78, valves 76 and lines 72 to urge pistons 38 (best illustrated in FIG. II) to the position wherein drill bit 52, carried by the driven shaft 32 is moved through the wall of pipe 2. When solenoid 86 is energized opening 46 in cylinder 40 communicates through line 74 with vent port 76a of valve 76.

Movement of piston 38 and shaft 32 to the position illustrated in FIG. II causes arm 56, rod 60 and dog 62 carrying abutment bolt 64 to a position wherein the end of bolt 64 closes switch 66.

Referring to FIG. V switches are connected from the source of electricity through conductors 101, 100, 98, 67 and conductor 66 to switches 66 which are in turn connected through conductors 70 to the coils of solenoids 88. Solenoids 88 are connected through ground conductors 102 to the source of electricity completed in circuit therethrough. When solenoids 88 are energized the valve element of valves 76 are shifted to the position wherein pressurized fluid from lines 78 is directed through lines 74 to openings 46 of cylinder 40. When switch 66 is energized opening 44 in cylinder 40 is connected through line 72 with the vent passage 76a of valve 76. It should be readily apparent that when switch 66 is closed fluid pressure is applied for moving piston 38 and therefore bit 52 in a direction away from pipe 2.

Pipe 2 is preferably moved at a speed of for example two and one-half feet per second and holes 2a are spaced for example four inches apart. Therefore, a hole is drilled every one and one-half seconds.

It should be appreciated that as cam 120 rotates projections 130 actuate switch 94 causing a signal to be generated which results in movement of the drilling bit 52 toward pipe 2 responsive to movement of pipe 2. As drill bit 52 moves toward pipe 2 the abutment screw 64 closes switch 66 responsive to movement thereof for generating a signal which results in retraction of drill bit 52 away from pipe 2.

As hereinbefore pointed out motors 20 of drilling units 12 and 14 rotate continuously permitting rapid movement of pistons 38 for moving drill bits 52 through the wall of pipe 2 and retracting same even though pipe 2 continuously moves relative to drilling units 12 and 14 without unduly elongating holes 2a and 2b formed in pipe 2.

From the foregoing it should be readily apparent that the method and apparatus hereinbefore described accomplishes the objects hereinbefore discussed. It should further be apparent that other and further embodiments of the invention may be devised without departing from the basic concept thereof.

Having described my invention I claim:

1. Pipe perforating apparatus comprising support means; a cam wheel rotatably secured to said support means and positionable in rolling engagement with a pipe; a shaft; a drill bit secured to said shaft; means movably securing said shaft relative to the support means; means secured to the shaft to rotate said shaft; actuated means secured between said shaft and said support means to move said shaft toward a pipe disposed in engagement with said cam wheel; actuating means associated with said cam wheel, said actuating means being arranged to actuate the actuated means to move the shaft toward a pipe; and means secured between said shaft and said support means for moving the shaft away from a pipe in engagement with said cam wheel.

2. The combination called for in claim 1 wherein the means for moving the shaft away from the pipe comprises means to generate a signal responsive to longitudinal movement of the shaft; and wherein the actuated means is arranged to move the shaft away from the pipe responsive to generation of a signal by said means to generate a signal.

3. The combination called for in claim 1 wherein the shaft comprises an expandable coupling having interengaging means disposed therein in sliding relation with an output shaft of a motor.

4. The combination called for in claim 1 wherein the actuated means to move the shaft toward a pipe comprises, a cylinder having ports in opposite ends thereof; a piston slidably disposed in the cylinder; means to deliver pressurized fluid through said ports to move the piston.

5. Perforating apparatus comprising: support means; a motor secured to said support means, said motor having a drive shaft; a driven shaft; means to movably secure the driven shaft relative to the support means; a cylinder having ports in opposite ends thereof, said driven shaft extending through said cylinder and through said ports; a piston slidably disposed in the cylinder; means securing said piston to said driven shaft; connector means securing the drive shaft to the driven shaft, said connector means being adapted to transmit rotational movement to said driven shaft while permitting longitudinal movement of the driven shaft; a drill bit secured to the driven shaft; valve means to deliver pressurized fluid to the inside of said cylinder, said valve means having a first position wherein pressurized fluid is delivered to the inside of said cylinder on one side of said piston and having a second position wherein pressurized fluid is directed to the inside of said cylinder on the opposite side of said piston; actuating means connected to said valve means, said actuating means being adapted to move the valve means between said first and second positions; means movable with a member to be perforated and associated with said actuating means such that said valve means is moved between said first and second positions in response to movement of the member to be perforated; and arm means secured to said driven shaft; a switch engageable by said arm means; a solenoid connected to said switch and operably connected to move said valve means between said first and second positions.

6. The combination called for in claim 5 wherein the connector means comprises splines on the drive shaft and a hub on the driven shaft having keyways formed therein to receive said splines, said splines being slidably disposed in said hub.

7. Perforating apparatus comprising: support means; a motor secured to said support means, said motor having a drive shaft; a driven shaft; means to movably secure the driven shaft relative to the support means; a cylinder having ports in opposite ends thereof, said driven shaft extending through said cylinder and through said ports; a piston slidably disposed in the cylinder; means securing said piston to said driven shaft; connector means securing the drive shaft to the driven shaft, said connector means being adapted to transmit rotational movement to said driven shaft while permitting longitudinal movement of the driven shaft; a drill bit secured to the driven shaft; valve means to deliver pressurized fluid to the inside of said cylinder, said valve means having a first position wherein pressurized fluid is delivered to the inside of said cylinder on one side of said piston and having a second position wherein pressurized fluid is directed to the inside of said cylinder on the opposite side of said piston; a solenoid operably connected to said valve means, said solenoid being adapted to move the valve means between said first and second positions; a wheel in rolling engagement with a member to be perforated; and a switch controlled by rotation of said wheel, said switch being connected to said solenoid such that said valve means is moved between said first and second positions in response to movement of the member to be perforated.

* * * * *